Sept. 15, 1925. 1,554,162
E. LANZEROTTI-SPINA
ENGINE CRANK CASE
Filed Oct. 31, 1924 4 Sheets-Sheet 1

INVENTOR.
Ettore Lanzerotti-Spina.
by
Attorney.

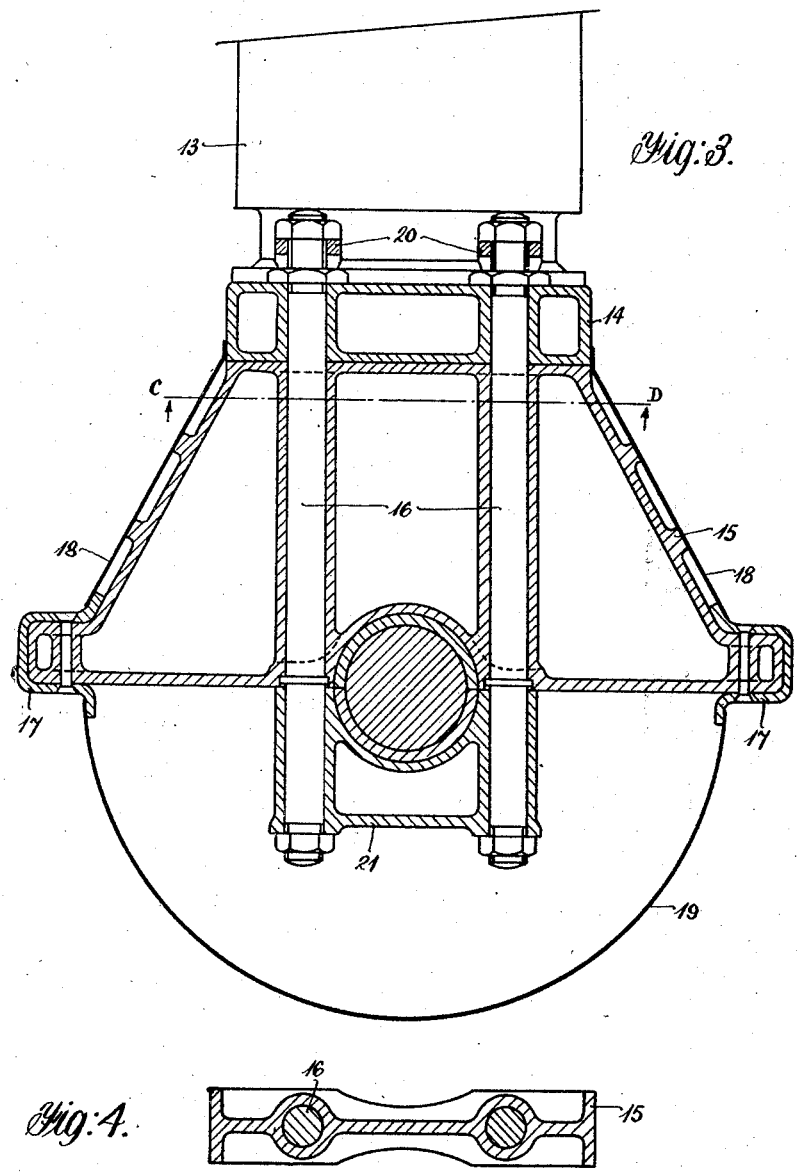

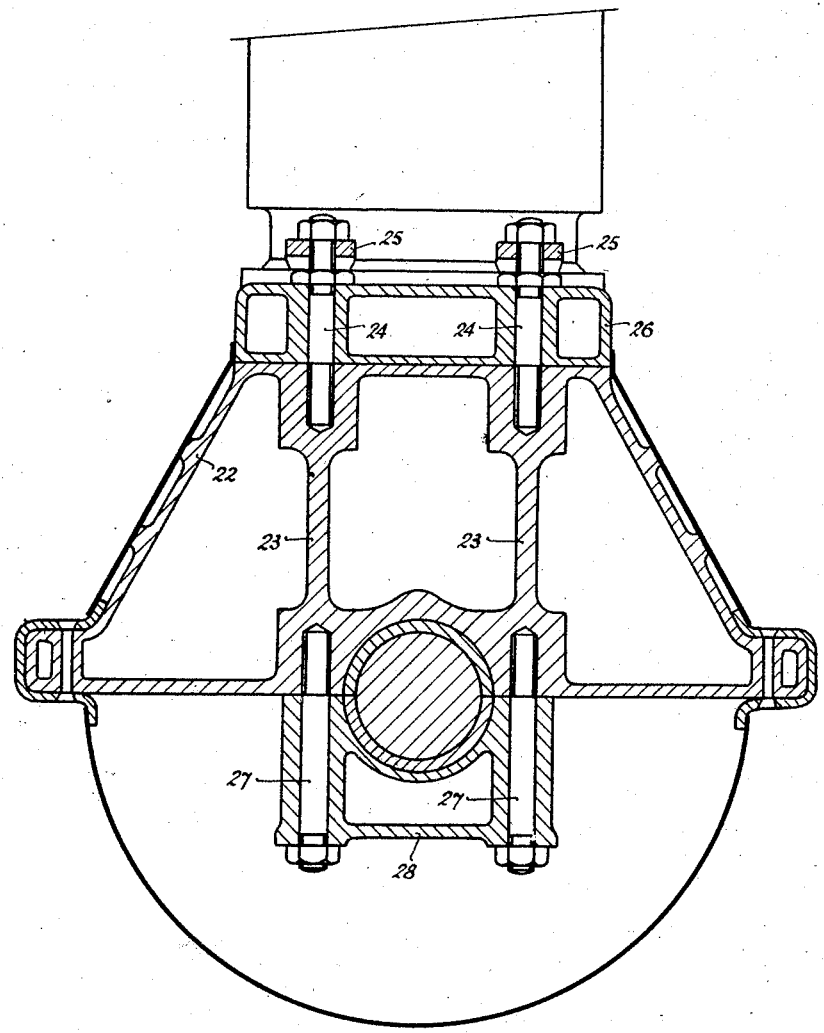

Patented Sept. 15, 1925.

1,554,162

UNITED STATES PATENT OFFICE.

ETTORE LANZEROTTI-SPINA, OF LONDON, ENGLAND, ASSIGNOR TO E. L.-S. ENGINES LIMITED, OF LONDON, ENGLAND, A BRITISH COMPANY.

ENGINE CRANK CASE.

Application filed October 31, 1924. Serial No. 747,124.

*To all whom it may concern:*

Be it known that I, ETTORE LANZEROTTI-SPINA, a subject of the King of Italy, residing at 29 Spring Gardens, Whitehall, London, S. W. 1, England, have invented new and useful Improvements in Engine Crank Cases, of which the following is a specification.

This invention relates to improvements in the construction of engine crank cases, and more especially to the crank cases of internal combustion engines used on aeroplanes and other aircraft where lightness is important.

The purpose of the invention is to enable the production of a crank case of adequate strength and of less weight than those hitherto in use.

More specifically the purpose of the invention is to provide separately and independently for the two functions the crank case has to perform, that is to say its function as an enclosure and its function as a structural or stress-bearing connection between cylinder and crank shaft.

A further purpose of the invention, incidental to the above, is the production of a structural connection between cylinder and crank shaft the strength and weight of which are concentrated along the lines on which the stresses due to the engine operation arise.

To this end the invention includes a cylinder supporting member or cylinder bed, and a plurality of transverse girders independent of the cylinder bed but connected with it by means appropriate to resist the thrust of the connecting rod. Each transverse girder may support a bearing for the crank shaft. The several girders may be further interconnected with each other and the cylinder bed by stay members extending longitudinally or diagonally of the engine.

A more specific embodiment of the invention includes a pair of longitudinal frame members, a cylinder bed, and a plurality of transverse girders connecting the frame members and supporting the bed. Such a structure may be formed into an enclosure by sheet metal attached to the cylinder bed and frame members.

Figure 1:
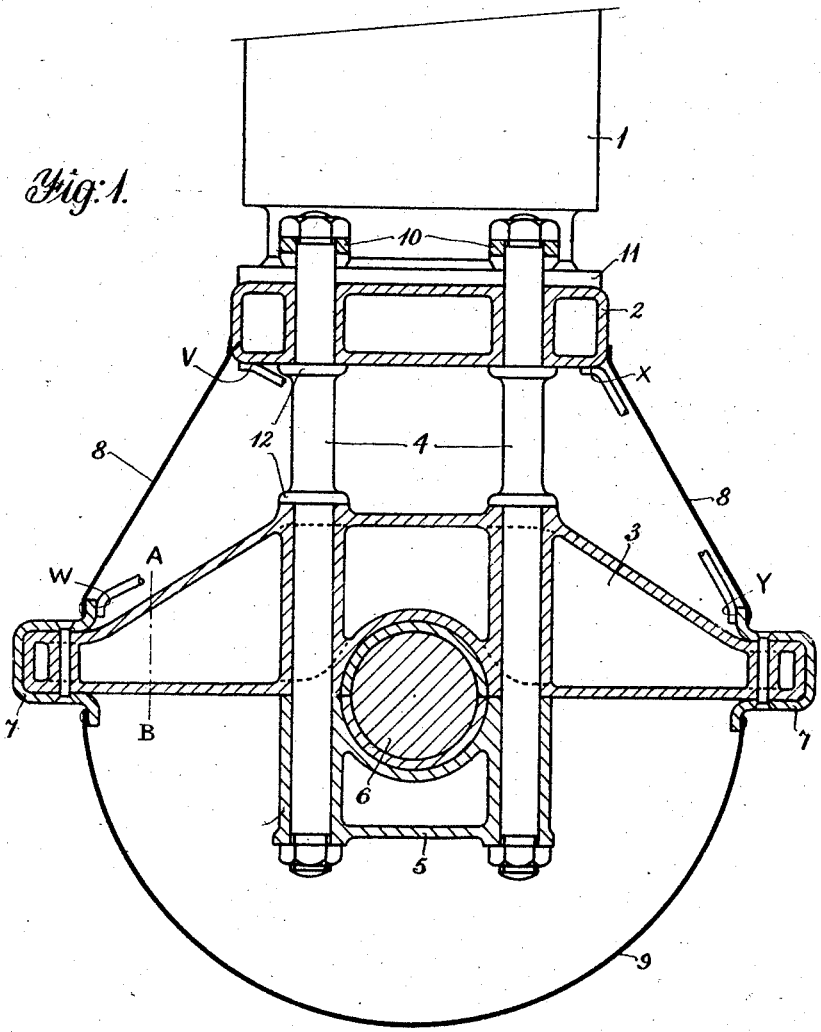
Figure 2:
Figure 6:
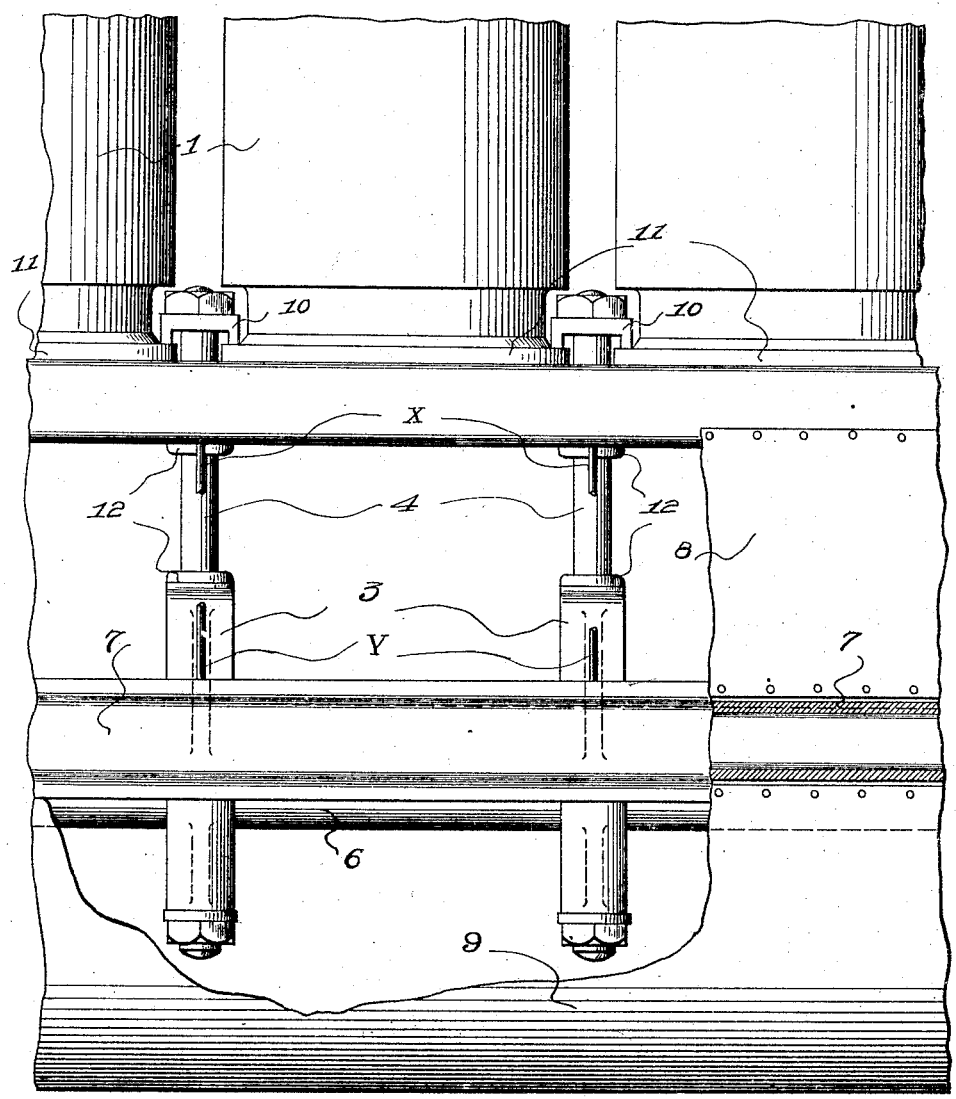

Further features of the invention will appear from the following description of embodiments illustrated in the accompanying drawings, whereof Figure 1 is a transverse section of a crank case through a crank shaft main bearing, Figure 2 a section on the line A—B of Figure 1, Figure 3 a transverse section through a main bearing of an alternative construction of crank case, Figure 4 a section on the line C—D of Figure 3, Figure 5 a transverse section through a main bearing of a further modification of the invention, and Figure 6 is a partial longitudinal elevation, partly in section, of the crank case shown in Figure 1.

These several embodiments of the invention are crank cases designed for the multi-cylinder engines of aeroplanes. The several cylinders, one of which is shown at 1 are mounted on a common bed plate, or preferably box section bed 2. The cylinders make spigot joints with the openings in the bed and have flanges resting on it by which they may be bolted to it. The bed is preferably so designed that it may be machined all over in order to reduce the weight to a minimum. A transverse girder 3, which is of I section as shown in Figure 2, or of other suitable girder form, is provided for each main bearing; that is to say in the case of a six cylinder engine with seven bearings there will be seven girders such as 3. These are joined to the cylinder bed 2 by means adapted to resist the stress of the engine thrust. In Figure 1 such means take the form of bolts 4, around which are distance pieces, for instance the integral collars 12 which keep the bed and girder the required distance apart. Each girder carries a main bearing, the bearing cap 5 being bolted to it, and so contributes to support the crank shaft 6. The bolts 4 are preferably spaced well apart to give increased lateral rigidity. If the bolts are widely spaced there is room between them for bearing bolts close to the bearing; but if they are not too far apart their lower ends may serve as shown for the attachment of the bearing cap 5, rendering independent bolts unnecessary.

The several girders 3 are further interconnected with each other so as to form together with the cylinder bed a complete stiff frame. In the drawings the girders unite longitudinal frame members 7, of suitable section, for instance channel section, and these act as bearers for the whole engine. Increased lateral stability may also be given by truss rods or tie rods, connecting points X, Y and V, W, or X, W and V, Y, and lying in the planes of the respective girders 3 or extending longitudinally over the interval between two girders. Fragments of such reinforcing frame members are indicated in the drawing at the respective points V, W, X, Y, different types being shown on the right and left hand halves of the drawing; but it will be understood that in practice the two sides will usually be alike, and not all—in some cases not any—of these reinforcements will be employed in a particular engine.

In Figure 1 the bolts 4 are made to serve the further purpose of attaching the cylinder 1 to the cylinder bed 2, dogs 10 engaging upon the flanges 11 of neighbouring cylinders being secured beneath the nuts on the bolts.

To complete a totally enclosed crank case, the bed 2 and frame members 7 are joined by sheet metal 8, and a sheet metal oil container 9 connects the two members 7; if the engine is to be used inverted the container 9 becomes the top cover plate. In engines of high power the structural members of the crank casing may be of steel of correspondingly thin cross section. They may suitably be stampings or pressings designed to be machined all over.

In Figures 3 and 4 the transverse girders 15 extend from the longitudinal frame members 17 up to the cylinder bed 14, upon which the cylinders 13 are secured as before by dogs 20 and bolts 16, the latter also carrying the bearing caps 21. The enclosure is completed by sheet metal 18 and 19. This construction enables the use of bolts of smaller diameter, since the rigid girders 15 take care of lateral strength. These girders may be of any convenient section which will afford the necessary strength with minimum weight; a suitable section is indicated in Figure 4.

In the modification shown in Figure 5 the girders 22 in part serve as tension members, being strengthened by webs 23 for that purpose. In place of the long bolts 4 and 16 of the constructions above described there are relatively short bolts or studs 24 fastening the cylinder by aid of dogs 25 to the cylinder bed 26, and other short bolts or set screws 27 supporting the bearing cap 28.

I claim—

In an internal combustion engine for aeroplanes, the combination of lateral longitudinal channel frame members having flanges projecting inwardly and providing inwardly opening channels, transverse girders having marginal flanges connected by a web and provided with outstanding portions fitted into and received between said flanges, whereby said flanges sustain the weight of the girders whether the engine is in normal or inverted position, crank shaft bearings secured to each of the respective girders, a cylinder supporting bed surmounting said girders, and means connecting said bed with said transverse girders.

In testimony whereof I have signed my name to this specification.

ETTORE LANZEROTTI-SPINA.